(12) United States Patent
Mukund et al.

(10) Patent No.: US 7,320,013 B2
(45) Date of Patent: Jan. 15, 2008

(54) METHOD AND APPARATUS FOR ALIGNING OPERANDS FOR A PROCESSOR

(75) Inventors: Shridhar Mukund, San Jose, CA (US); Mahesh Gopalan, San Jose, CA (US); Neeraj Kashalkar, Irvine, CA (US)

(73) Assignee: Adaptec, Inc., Milpitas, CA (US)

( * ) Notice: Subject to any disclaimer, the term of this patent is extended or adjusted under 35 U.S.C. 154(b) by 734 days.

(21) Appl. No.: 10/726,427

(22) Filed: Dec. 2, 2003

(65) Prior Publication Data

US 2004/0210610 A1 Oct. 21, 2004

Related U.S. Application Data

(60) Provisional application No. 60/433,438, filed on Dec. 12, 2002.

(51) Int. Cl.
*G06F 5/01* (2006.01)
(52) U.S. Cl. .................................. 708/209
(58) Field of Classification Search ............... 708/209, 708/513
See application file for complete search history.

(56) References Cited

U.S. PATENT DOCUMENTS

| | | | | |
|---|---|---|---|---|
| 3,747,070 A | * | 7/1973 | Huttenhoff | 377/81 |
| 4,542,476 A | | 9/1985 | Nagafuji | |
| 5,268,855 A | * | 12/1993 | Mason et al. | 708/513 |
| 5,721,841 A | | 2/1998 | Szczepanek | |
| 5,726,926 A | * | 3/1998 | Makino | 708/505 |
| 5,771,183 A | * | 6/1998 | Makineni | 708/205 |
| 5,790,444 A | * | 8/1998 | Olson et al. | 708/501 |
| 5,822,559 A | * | 10/1998 | Narayan et al. | 712/214 |
| 5,844,828 A | * | 12/1998 | Fujimura et al. | 708/209 |
| 5,926,475 A | | 7/1999 | Saldinger et al. | |
| 5,978,822 A | * | 11/1999 | Muwafi et al. | 708/209 |
| 6,044,061 A | | 3/2000 | Aybay et al. | |
| 6,064,649 A | | 5/2000 | Johnston | |
| 6,072,772 A | | 6/2000 | Charny et al. | |
| 6,115,729 A | * | 9/2000 | Matheny et al. | 708/501 |
| 6,195,739 B1 | | 2/2001 | Wright et al. | |
| 6,311,199 B1 | * | 10/2001 | Tamura et al. | 708/204 |
| 6,330,236 B1 | | 12/2001 | Ofek et al. | |
| 6,557,096 B1 | | 4/2003 | Ganapathy et al. | |
| 6,564,238 B1 | * | 5/2003 | Kim et al. | 708/513 |
| 2002/0064170 A1 | | 5/2002 | Siu et al. | |

* cited by examiner

*Primary Examiner*—D. H. Malzahn
(74) *Attorney, Agent, or Firm*—Martine Penilla & Gencarella, LLP

(57) ABSTRACT

A method for transparently presenting different size operands to be processed is provided. The method initiates with providing a first operand having a first bit-width. Then, a bit width of a second operand associated with a processor is determined. The second operand has a greater bit width than the first operand. Next, the first operand is transformed by aligning a least significant bit of the first operand to a lowest bit position of a transformed operand having a bit size equal to the second operand. Then, the bits of the transformed operand are sign extended and padded in a manner to allow carry propagation. Next, the transformed operand is transmitted to the processor. A method for shifting operands and a processor are also provided.

18 Claims, 9 Drawing Sheets

METHOD AND APPARATUS FOR ALIGNING OPERANDS FOR A PROCESSOR

CROSS REFERENCE TO RELATED APPLICATION

This application claims priority from U.S. Provisional Patent Application No. 60/433,438 filed Dec. 12, 2002 and entitled "Method and Apparatus for Aligning Operands for a Processor." This provisional application is herein incorporated by reference.

BACKGROUND OF THE INVENTION

1. Field of the Invention

This invention relates generally to networking and more particularly to a method and apparatus for handling arithmetic computation at high data rates in a networking environment.

2. Description of the Related Art

Networking bandwidth has increased significantly and continues to enable higher data rates over networks. In fact, the increase in networking bandwidth has outpaced the concomitant increase in the processing capacity of processors receiving the data. The data provided to the processors over a distributed network comes into a host central processing unit (CPU) at a rate that is difficult for a single CPU to keep up with. Furthermore, the processing power of the CPU that is consumed for stripping and building data packets for receipt and transmission becomes prohibitive and causes delays for applications requiring CPU processing time.

FIG. 1 is a simplified schematic diagram of a host system configured to receive Ethernet packets. Host 100 includes software stack 102. Software stack 102 includes Internet Small computer System Interface (iSCSI) layer, Transmission Control Protocol (TCP) layer, Internet protocol security (IPSec) layer, and Internet protocol (IP) layer. As is generally known by those in the art, the software stack peels back the headers of a packet to receive the encapsulated data or builds up the packets for eventual transmission over network 108. Network interface card (NIC) 104 includes microprocessor 106 which is configured to receive and transmit Ethernet packets over network 108.

One of the shortcomings of the design illustrated in FIG. 1 is that a single host processor is responsible for performing the operations associated with software stack 102. Thus, as throughputs are continually being pushed higher, the single processor of the host is limited in the capability of supporting the throughput of the incoming data stream because of the built in latencies associated with the single processor of a host system. That is, the processor of the host can not consistently process the incoming data and execute routine processing instructions associated with a running application in a manner which limits latencies and at least supports the throughput of an incoming data stream. One solution to this shortcoming is to replace the single host processor with multiple CPUs on a board. However, this solution becomes prohibitively expensive, thus, multiple CPU's on a board is not an optimal alternative. In addition, due to the complexity of the processing occurring with respect to the networking application the use of a state machine is not feasible for the network processing.

In view of the foregoing, there is a need to provide a chip optimized for networking applications to process data efficiently and cost effectively in order to offload processing from the CPU to free CPU time for other applications.

SUMMARY OF THE INVENTION

Broadly speaking, the present invention fills these needs by providing a processor adapted for networking applications that efficiently processes data packets and offloads processing from the central processing unit of a host system. It should be appreciated that the present invention can be implemented in numerous ways, including as a process, an apparatus, a system, or a device. Several inventive embodiments of the present invention are described below.

In one embodiment, a method for efficiently shifting operands for processing is provided. The method initiates with receiving an operand. Then, a) a shift value to be applied to the operand at a first stage is determined; b) the operand is shifted by the shift value and c) the shifted operand is output to a second stage. Operations a), b), and c) are repeated for successive stages until the operand is shifted for processing. Then, the operand is processed.

In another embodiment, a method for transparently presenting different size operands to be processed is provided. The method initiates with providing a first operand having a first bit-width. Then, a bit width of a second operand associated with a processor is determined. The second operand has a greater bit width than the first operand. Next, the first operand is transformed by aligning a least significant bit of the first operand to a lowest bit position of a transformed operand having a bit size equal to the second operand. That is, the first operand is sign extended to a bit width equal to the bit width of the second operand. Then, the bits of the transformed operand padded to a bit width capable of being processed by a processor. Next, the transformed operand is transmitted to the processor.

In yet another embodiment, a processor is provided. The processor includes an input socket configured to receive and transmit data packets. A transform unit for manipulating data is included. The transform unit is configured to receive data packets from the input socket. An arithmetic logic unit (ALU) configured to process multiple operands is included. The ALU includes a shifter configured to shift each of the multiple operands in stages and an adder configured to add operands. An alignment block having circuitry configured to align a lowest significant bit of each of the multiple operands prior to transferring each of the multiple operands to the ALU is included. The alignment block circuitry extends each of the multiple operands to a defined bit width so that a pre-extending bit width of each of the multiple operands is transparent to the ALU. A bus connecting the input socket, the transform unit, the ALU, and the alignment block is also provided.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

Figure 1:
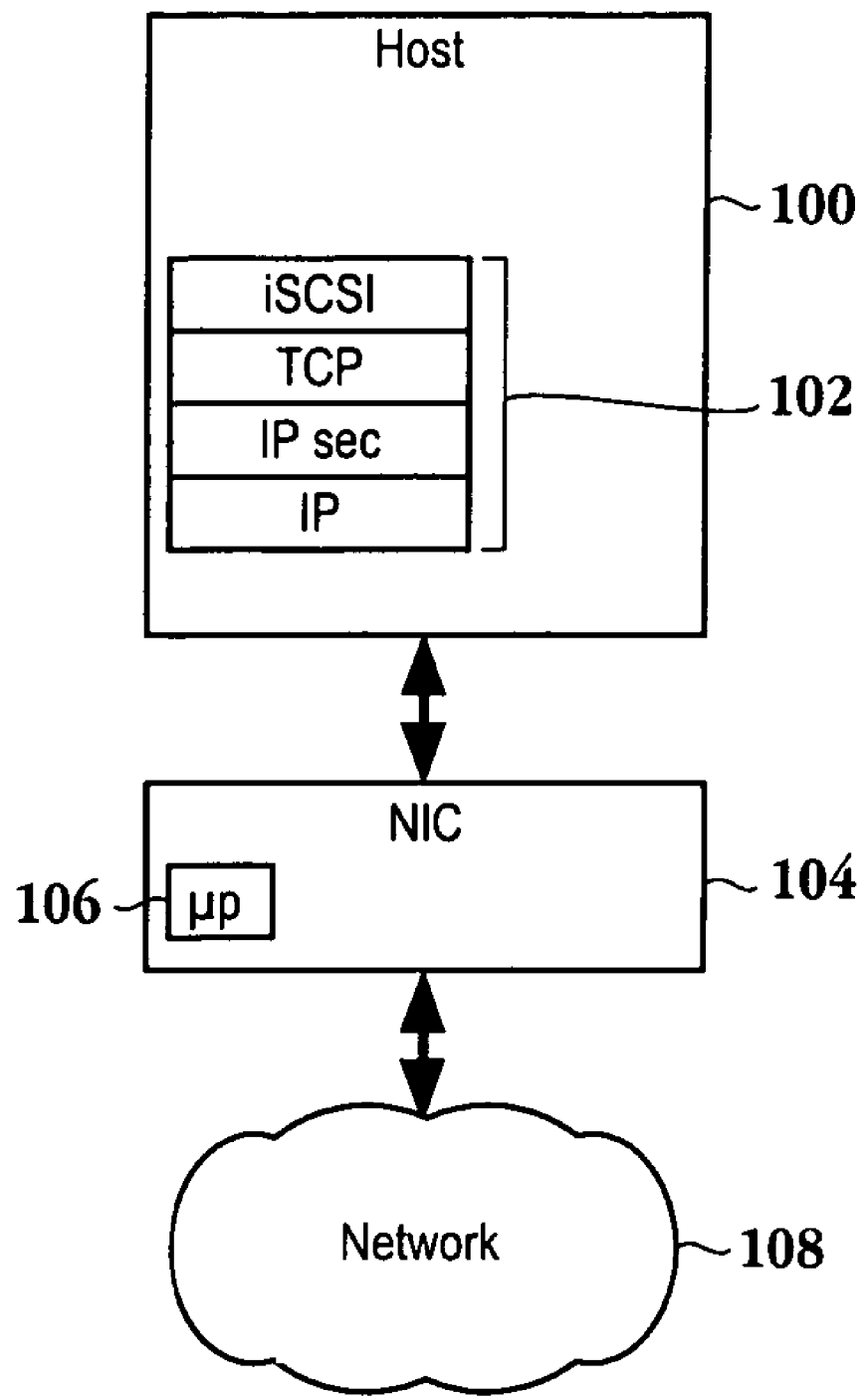
FIG. 1 is a simplified schematic diagram of a host system configured to receive Ethernet packets.

An invention is described for a processor optimized for network applications. The processor is configured to allow a single cycle access to a large address space while an align function allows the arithmetic logic unit (ALU) of the processor to process multiple width size operands by shifting and padding the operands so that different width sizes become transparent to the ALU. It will be apparent to one skilled in the art, that the present invention may be practiced without some or all of these specific details. In other instances, well known process operations have not been described in detail in order not to unnecessarily obscure the present invention. FIG. 1 is described in the "Background of the Invention" section.

The embodiments described herein provide a processor configured to efficiently process incoming or outgoing packet data. In one embodiment, the processor is arranged in a pipeline architecture, where one or more of the processors may be associated with a certain stage of the pipeline. The processor pipeline offloads previous processing performed by a central processing unit (CPU) of a host system, thereby freeing the CPU for other processing to improve system performance. As will be explained in more detail below, the processor is configured to allow a single cycle access to a large address space.

Figure 2:
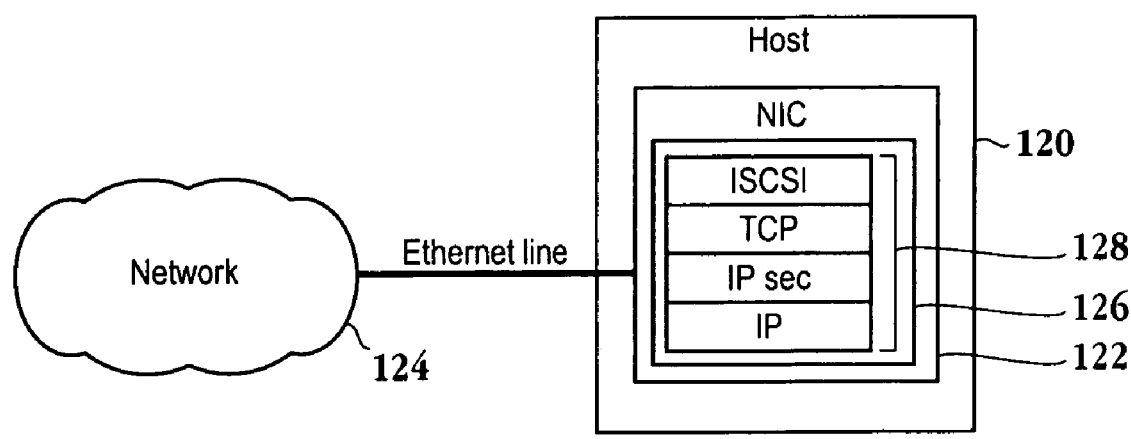
FIG. 2 is a high-level simplified schematic diagram of a network interface card (NIC) having the capability of processing multiple layers of a packet header in accordance with one embodiment of the invention.

FIG. 2 is a high-level simplified schematic diagram of a network interface card (NIC) having the capability of processing multiple layers of a packet header in accordance with one embodiment of the invention. Host 120 includes NIC 122. NIC 122 is in communication with network 124 over an Ethernet line. Software stack 128 includes internet small computer system interface (iSCSI) layer, transmission control protocol (TCP) layer, internet protocol security (IPSec) layer and internet protocol (IP) layer. Here, software stack 128 peels back the headers of a data packet received by NIC 122. Alternatively software stack 128 may build the data packets for eventual transmission over network 124. It should be appreciated that offloading the encapsulation and stripping processes of the data packets from host 120 to NIC 122 frees the host for processing associated with other applications. Furthermore, the pipelined configuration of NIC 122 allows for the encapsulation and stripping processes to be broken down into simple steps that concentrate on a particular segment of the processing to process the data efficiently.

Figure 3:
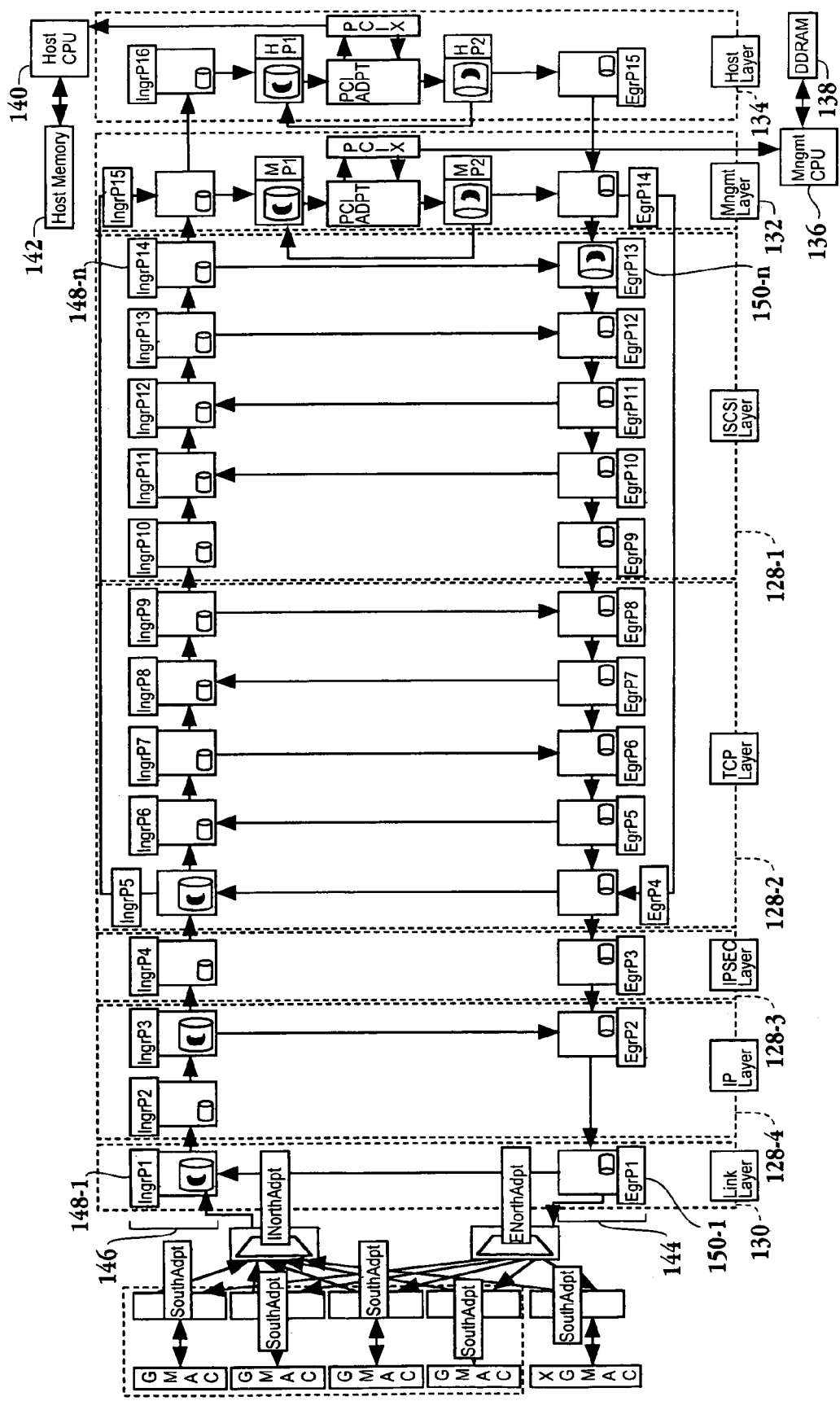
FIG. 3 is a schematic diagram illustrating a configuration of pipelined processors for processing different stages of a received packet in accordance with one embodiment of the invention.

FIG. 3 is a schematic diagram illustrating a configuration of pipelined processors for processing different stages of a received packet in accordance with one embodiment of the invention. As can be seen, each of the layers associated with the software stack, i.e., IP layer 128-4, IP SEC layer 128-3, TCP layer 128-2, ISCSI layer 128-1, are defined as distinct stages. Each of the stages include at least one processor to manipulate the data received from or sent to each of the stages. Processors 148-1 through 148-n make up the processing pipeline for the receiving side 146. Processors 150-1 through 150-n make up the processing pipeline for the transmit side 144. Layers 128-1 through 128-4 are located between link layer 130 and management layer 132. One skilled in the art will appreciate that link layer 130 provides the communication interface for an Ethernet connection, while management layer 132 provides the communication interface for the host layer 134. Management layer 132 includes management CPU 136, which is in communication with dynamic random access memory (DRAM) 138. Host layer 134 includes a communication interface with host CPU 140. CPU 140 is in communication with host memory 142. In one embodiment, each of the processors 148-1 through 148-n and 150-1 through 150-n contain at least three memory regions in order to maintain a line throughput rate for a data stream being received or transmitted. It should be appreciated that while a certain number of processors is shown in FIG. 3 for each stage, any suitable number of processors can be included in each stage. That is, the number of processors associated with each stage is any suitable number of processors in order to build or strip the data packets for the next processor or next stage. It will be apparent to one skilled in the art that the processors illustrated in FIG. 3 may be located on a printed circuit board and can be configured as a plug-in card. In addition, each of layers 128-1 through 128-4 may be referred to as pipeline stages.

Figure 4:
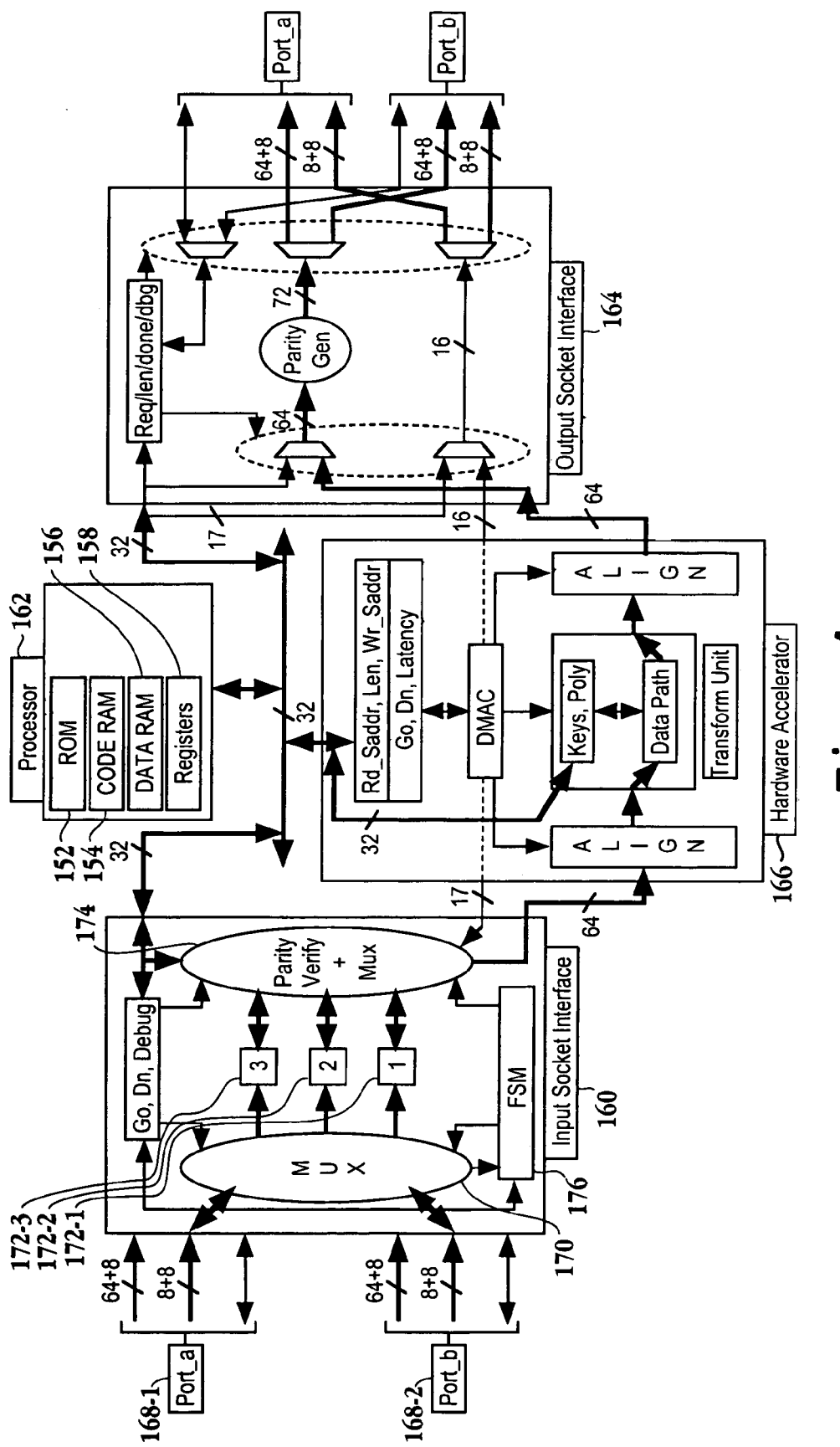
FIG. 4 is a schematic diagram illustrating the modules of the processor complex in accordance with one embodiment of the invention.

FIG. 4 is a schematic diagram illustrating the modules of the processor complex in accordance with one embodiment of the invention. Each of the pipelined processors include input socket interface 160, star processor 162, output socket interface 164 and hardware accelerator 166. It should be appreciated that for pipelined processors the output socket interface of a first processor is in communication with an input socket interface of a second processor, and so on for each of the pipelined processors. In one embodiment, input socket interface 160 has two input ports, port A 168-1 and port B 168-2. Each of these ports consists of a 72-bit data bus, a 16-bit address bus (8 bits of address and 8 bits as byte mask) and handshake signals. Data from port A 168-1 and port B 168-2 is communicated to multiplexer 170. In another embodiment, a scheduling algorithm schedules port A and port B requests in a round robin fashion. Multiplexer 170 distributes the packet data into three static random access memory (SRAM) locations. The three SRAM locations are represented by blocks 172-1 through 172-3. In another embodiment, SRAM regions 172-1 through 172-3 are single ported memories. The three single ported memories allow for the throughput rate to be maintained for an incoming data stream, while occupying a minimal amount of area on the chip surface. Each of the memories, also referred to as buffers, 172-1 through 172-3 are in communication with the parity verify in multiplex block 174. It will be apparent to one skilled in the art that the parity verify and multiplex block 174 is a piece of hardware that verifies the parity bits appended to a message. Input socket interface 160 includes finite state machine 176. In one embodiment, when a request is forwarded to finite state machine 176, the finite state machine checks for space availability in the buffers 172-1 through 172-3. Here, a pointer points to the buffer that was last written to and if space is available in the buffer that was last written to, then this buffer is used for writing an incoming packet. In one embodiment, the buffer is used for multiple packets when it is determined that writing multiple packets to a buffer does not cause a delay in a subsequent reading operation.

Input socket interface 160 of FIG. 4, may be configured as a hold-off socket. That is, at times some data may come into the input socket that may need to access a data structure that is not in Data RAM 156 as the capacity of the Data RAM is limited. Thus, the data structure may be stored in external memory, such as dynamic random access memory (DRAM). If the associated data structure is not cached, then it will have to be fetched from the external memory. In order to prevent hold up of all the pipeline processing due to the data fetch, at least three buffers 172-1 through 172-3 are provided. In one embodiment, between 3 and 32 buffers are provided to maintain the line rate of the incoming data.

Processor 162 includes read only module (ROM) 152, code random access memory (RAM) 154 data RAM 156 and registers 158. The instruction for the processor to perform its functions is held in the code space, i.e., memory, provided by ROM 152 and code RAM 154. It should be appreciated that by dividing the code space into two parts allows for accommodating fixed code to be used in every stage of the pipeline of processors in one of the parts. Thus, common functions used by each processor of the pipeline are stored in ROM 152, which can be replicated for each processor at each stage. Examples of a common function include instructions for downloading specific microcode for the pipeline stage and moving data between modules. Code RAM 154 contains the specific processing instructions for the functionality performed by the pipeline stage of which processor 162 is located. For example, processor 162 may perform specific functionality for the IPsec layer or one of the other stages described with reference to FIG. 2. Thus, code RAM 154 would contain the specific processing instructions for the IPsec layer here.

Data RAM 156 enables the processor to access different data structures. For example, a TCP connection behind a TCP packet is associated with a protocol and a data structure. The processor must access the associated data structure to process the TCP packet. Similarly, for the IP layers and the iSCSI layer there will be associated data structures that are fetched and written back from a suitable media or external storage. In addition, registers 158 provide temporary storage when writing microcode. In one embodiment of FIG. 3, after powering-up, code RAM 154 does not have any meaningful data in it. Accordingly, processor 162, upon power-up, will start executing a special system routine from ROM 152 which will initialize the first location of code RAM 154 with a jump statement to the right place in the ROM.

Still referring to FIG. 4, Hardware Accelerator 166, also referred to a Transform unit, transforms the data. For example, when doing iSCSI processing a data digest or cyclic redundancy check (CRC) must be computed. Here, hardware accelerator 166 performs this function. Additionally, hardware accelerator 166 may perform some align functions. For example, the data packet may start at a certain offset at a first pipeline stage, but when the data is passed to a next pipeline stage it may be desired to start at a different offset, i.e., realign the data, as discussed in more detail below. In one embodiment, processor 162 communicates with input socket 160 to determine the data to be communicated to Transform Unit 166. Subsequently, processor 162 directs transform unit 166 to perform processing as the transform unit moves the data. In addition, processor 162 may instruct transform unit 166 to move data from a first offset to a second offset, as well as specifying a particular transformation process. It should be appreciated that input socket 160, processor 162, output socket 164 and transform unit 166 are the modules of a processor complex that is replicated for each of the stages of a pipeline architecture, wherein the replicated processor complex can be customized for a particular stage.

Figure 5:
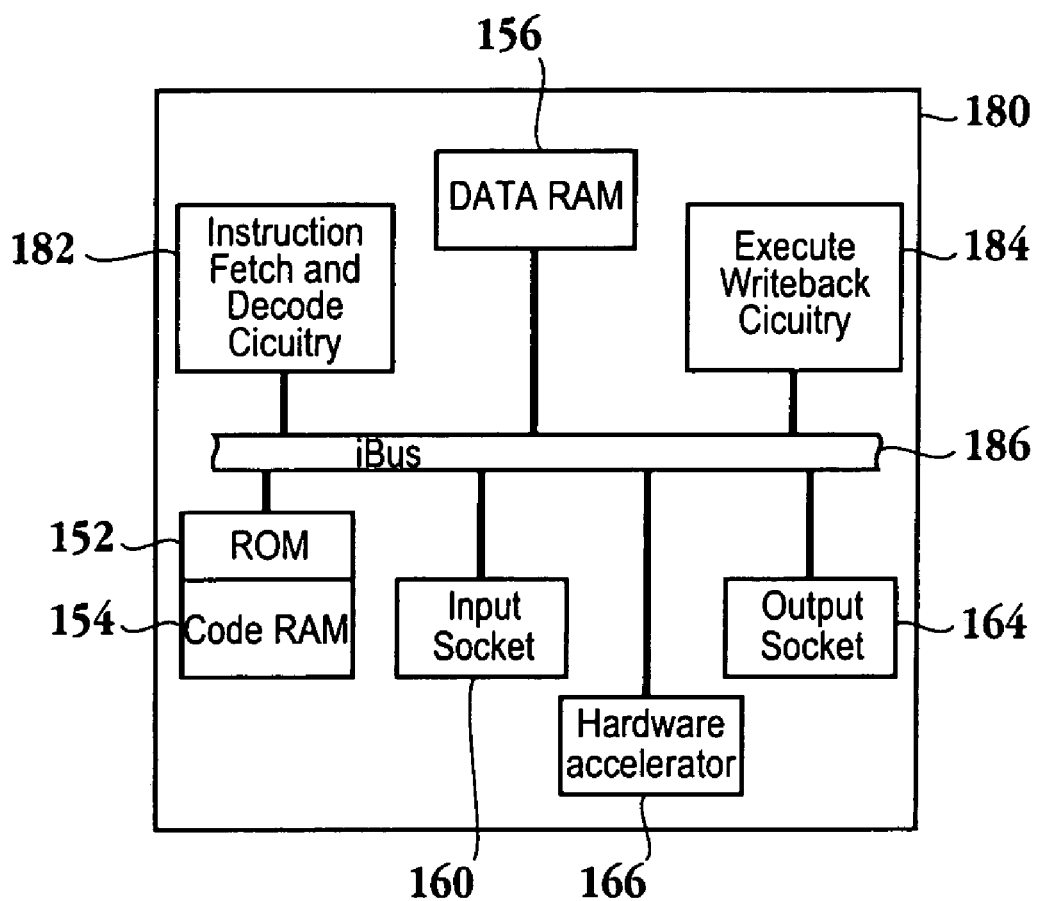
FIG. 5 is a high level block diagram of the components of a processor complex configured to efficiently process data packets in accordance with one embodiment of the invention.

FIG. 5 is a high level block diagram of the components of a processor complex configured to efficiently process data packets in accordance with one embodiment of the invention. It should be appreciated that processor complex 180 may be replicated a number of times to form a pipeline wherein certain processors of the pipeline perform processing operations associated with particular stages of the pipeline. For example, processor complex 180 may be used to process the various header layers at each of the stages as illustrated with reference to FIG. 3. Processor complex 180 includes input socket 160, output socket 164, and hardware accelerator 166. As mentioned above, hardware accelerator 166 may also be referred to a transform unit. Also included in processor complex 180 are ROM 152, Code RAM 154, Data RAM 156, instruction fetch and decode circuitry 182 and execute and write back circuitry 184. Each of the above mentioned components of FIG. 5 communicate through internal bus (IBUS) 186. For example, in one embodiment IBUS 186 carries all signals that control the writes and the reads from all the memories associated with the processor complex. It should be appreciated that instruction fetch and decode circuitry 182 includes circuitry configured to perform instruction fetches and interpret the instructions to provide an arithmetic logic unit (ALU) with the functions to be performed. Execute and write back circuitry 184 includes circuitry configured to set up operands, process the operands through the ALU and write back the processed data.

Figure 6:
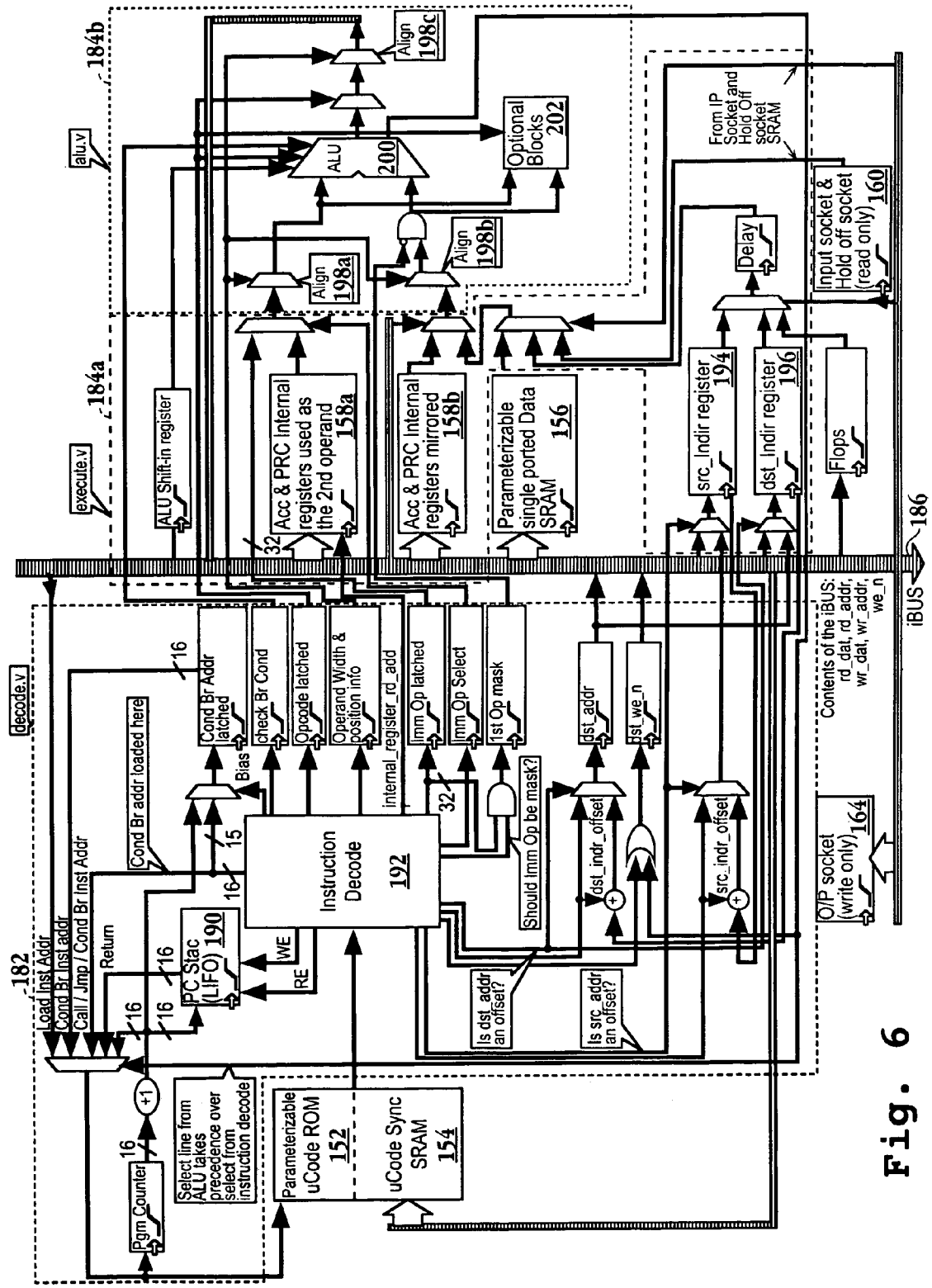
FIG. 6 is a more detailed block diagram of the instruction fetch and decode circuitry and the execute and write back circuitry of FIG. 5 in accordance with one embodiment of the invention.
Figure 7:
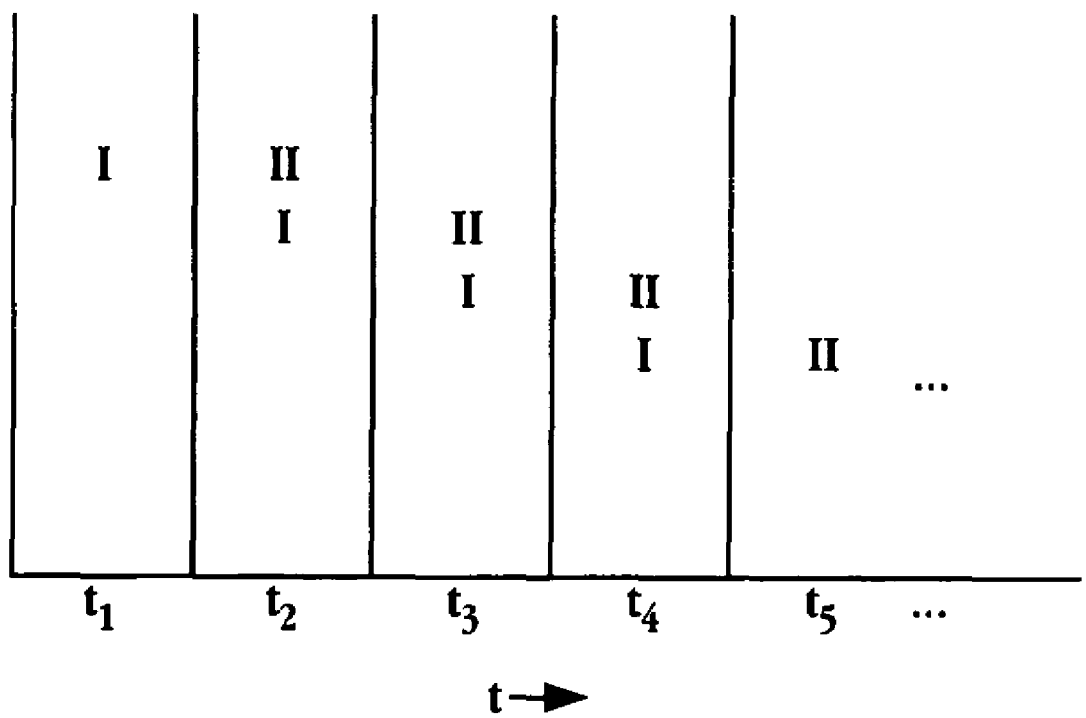
FIG. 7 is a graphical representation of the two stage pipeline configuration for the processor complex in accordance with one embodiment of the invention.

FIG. 6 is a more detailed block diagram of the instruction fetch and decode circuitry and the execute and write back circuitry of FIG. 5 in accordance with one embodiment of the invention. Instruction fetch and decode circuitry 182 and execute and write back circuitry 184a and 184b allow for the processor to be run as a two stage pipeline process. For example, with reference to FIG. 7, a graphical representation of the two stage pipeline configuration for the processor complex is illustrated in accordance with one embodiment of the invention. Instruction fetch and decode operation (I) is executed during time period $t_1$. As mentioned above, the instruction fetch and decode operation includes reading instructions from memory, such as ROM 152 or code RAM 154 of FIG. 6. The fetched instructions are then decoded by instruction decode 192. Then, during time period $t_2$, execute and write back operation (II) is executed. Here, the operands are set up for the ALU, the ALU performs the processing and the data is written back. Simultaneously, the instruction fetch and decode operations for the next instruction is being performed during the second clock cycle, i.e., $t_2$. It should be appreciated that if the processes from operations I and II were performed in one clock cycle, the amount of time to complete the operation would be unnecessarily long. In addition, the instructions would have to be fetched on the same clock cycle that obtains the addresses of the instructions. Thus, the processor could not run at high speeds. Accordingly, when the processor is configured to perform as a two stage pipeline, one instruction can be executed per clock cycle to optimize the performance of the processor.

Returning to FIG. 6, instruction fetch and decode circuitry 182 includes instruction decode circuitry 192, which is configured to receive data from ROM 152 and Code RAM 154. Instruction decode circuitry 192 is in communication with program counter (PC) stack 190. Stack 190 is configured to call subroutines and enable the return to a defined point after execution of the subroutine. It should be appreciated that in an effort to keep the size of the processor to a minimum, the instruction set recognized by instruction decode circuitry is general and compact. In addition, the amount of redundancy is limited, therefore, in conjunction with the compact set of instructions, the size of the processor is minimized so that a maximum number of processors can fit on a single chip to perform the necessary network processing. Furthermore, the instruction memory size can be of variable size for each processor depending on the need for memory at each stage of the pipeline. TABLE 1 illustrates the organization of the instruction format for a 96 bit instruction in accordance with one embodiment of the invention.

TABLE 1

| Instruction Bit(s) | Meaning assigned for decode |
|---|---|
| 95:94 | In the case of a destination indirect operation these bits specify which one of the 4 available destination indirect registers to use |
| 93:92 | In the case of a source indirect operation these bits specify which one of the 4 available source indirect registers to use |
| 91 | When set, it loads the destination indirect address register with the final read address generated by the instruction. |
| 90 | When set, it loads source indirect address register with the final read address generated by the instruction. |
| 89 | Branch Instruction bias. When set it implies that the bias is in favor of the branch being taken. If reset, it implies that the bias is in favor of the branch not being taken. |
| 88 | Use the Destination Indirect address register to derive the actual destination address. |
| 87 | Use the Source Indirect address register to derive the actual source address. |
| 86:85 | Operand Size Specification. 00 = Byte Operation, 01 = Word Operation, 10 = Double Word Operation. |
| 84 | The return bit |
| 83 | ALU instruction/external Instruction select |
| 82:78 | Instruction Op-code |
| 77:70 | 2nd Operand select. It is the byte address of the internal register that is specified as the second operand. The immediate operand address will be all 1's. |
| 69:51 | Source Address |
| 50:32 | Destination Address/Jump address. When used as the jump address bits 49:36 should specify the 14-bit jump address which is the value that should be loaded into the program counter. The other unused bits should all be 0's. |
| 31:0 | Immediate Operand/Mask |

TABLE 2 illustrates the instruction set in accordance with one embodiment of the invention. Notes 1-6 below TABLE 2 are applicable to the corresponding instructions as defined in TABLE 2. It should be appreciated that operation codes 0x10 and 0x11 include an "and" instruction combined with a "jump on zero" (JZ) or a "jump on no zero" (JNZ) instruction, which allows for completion of the operation in one cycle rather than two cycles for the separate instructions.

TABLE 2

| OP-CODE | INSTRUCTION | NOTES |
|---|---|---|
| 0x00 | CMPJ_GT | 1, 2, 3, 6 |
| 0x01 | CMPJ_LT | 1, 2, 3, 6 |
| 0x02 | CMPJ_EQ | 1, 2, 3, 6 |
| 0x03 | LOOP | 1, 2, 4, 6 |
| 0x04 | SUB | 1, 3, 6 |
| 0x05 | ADD | 1, 3, 6 |
| 0x06 | ADD_JC | 1, 2, 3, 6 |
| 0x07 | ADD_JNC | 1, 2, 3, 6 |
| 0x08 | ADDC | 1, 3, 6 |
| 0x09 | XOR_JZ | 1, 2, 3, 6 |
| 0x0A | XOR_JNZ | 1, 2, 3, 6 |
| 0x0B | XOR | 1, 3, 6 |
| 0x0C | OR | 1, 3, 6 |
| 0x0D | SHR | 1, 3, 6 |
| 0x0E | SHL | 1, 3, 6 |
| 0x0F | AND | 1, 3, 6 |
| 0x10 | AND_JZ | 1, 2, 3, 6 |
| 0x11 | AND_JNZ | 1, 2, 3, 6 |
| 0x12 | CALL | |
| 0x13 | JMP | |
| 0x14 | LOAD | 5 |
| 0x15-0x1F | UNUSED | |
| 0x20 | GF_MULTI | 1, 3, 6 |
| 0x21 | HASH | 1, 3, 6 |
| 0x22-0x3F | UNUSED | |

Note 1:
These instructions may be specified with a.b or a.w or a.l extension to indicate if the instructions are byte operations, word operations, or double word operations, respectively. It should be appreciated that Note 1 is associated with the align function discussed herein.
Note 2:
These instructions may be specified with a bias that is toward the jump or the next sequential instruction. Here, a clock cycle is saved by specifying a jump bias.
Note 3:
These instructions may specify either an immediate operand or a mask.
Note 4:
These instructions may specify only an immediate operand.
Note 5:
These instructions may specify only a mask.
Note 6:
These instructions can be specified with the return bit set, i.e., after the particular instruction is executed, the program counter will be loaded with the value at the top of the stack. It should be appreciated that there is not a separate return instruction, therefore, in order to return from a subroutine the return is specified within the instruction itself. Even a conditional jump instruction can have a return bit set where if a condition is not satisfied do the return and if the condition is satisfied take the jump.

The instruction fetch and decode operating instructions include branch prediction capability which optimizes the time for processing. It should be appreciated that when performing pipeline processing it is possible that the instruction fetched is not the correct instruction for the branch. Thus, it is possible to take two clock cycles for a particular branched instruction rather than one. In order to minimize that occurrence, the microcode can specify which direction the branch is likely to take. Therefore, if the branch proceeds in the predicted direction there will be no extra latency. In one embodiment, NO OPERATION (NOP's) instructions are introduced in hardware to allow for blocking an instruction that was favored, i.e., predicted, but is not the instruction actually executed. One skilled in the art will appreciate that NOP's are instructions that do nothing to insert an idle cycle or delay the next instruction by one clock. It should be appreciated that every conditional branch instruction will specify a bias either toward sequential execution or toward taking the jump. If a jump is taken in the biased direction, the conditional branch will complete in 1 clock cycle, otherwise the conditional branch will take 2 clock cycles. That is, conditional jumps may take an extra clock cycle if the non-biased branch is taken. In one embodiment, conditional jump instructions are provided as 2 operation codes with one operation code having instructions for favoring the jump and one instruction favoring sequential execution. In another embodiment, hardware NOP insertion will be performed by disabling the write-enable in the IBUS for an instruction that is pre-fetched but invalidated. PC Stack 190 will get loaded with the biased address and a delayed branch address register will store the non-biased address. It should be appreciated that the branch prediction microcode is stored in code RAM 154. In one embodiment, each branch instruction for each of the processors at each of the stages specifies the branch most likely to be used.

In one embodiment, each instruction of the processor includes a source operand, a destination operand, and an immediate or an internal register operand. It should be appreciated that a source operand indicates a source location, the destination operand specifies the destination for storing the resulting value of the processing, while the immediate or the internal register operand performs some restriction on the source operand. It should be further appreciated that the configuration described herein does not require the instructions to be placed into a register in order to be operated on. That is, the operations are performed directly on data sitting in code RAM 154, thus, the data can be addressed and operated on in a single clock cycle. In other words, the embodiments described herein allow for a single cycle access from the SRAM. Code RAM 154 and Data RAM 156 provide a large addressable space to write to rather than an internal register in conventional processors. It should be appreciated that src_indir (source indirect) register 194 and dst_indir (destination indirect) register 196, internal registers 158*a* and 158*b*, and data memory SRAM 156 can all be specified as either a source or destination address of an instruction.

The microcode SRAM 154 and output socket 164 can be specified as the destination address of an instruction only, i.e. they are write only. Input socket 160 can be specified as the source address of an instruction only, i.e. it is read only. In one embodiment, src_indir register 194 and dst_indir register 196 are replicated multiple times.

In another embodiment, only internal registers 158*a* and 158*b* can be specified as the second operand. Since internal registers 158*a* and 158*b* may appear in both $1^{st}$ and $2^{nd}$ operand positions, the internal registers are duplicated as shown in FIG. 6. Internal registers 158*a* and 158*b* are implemented as dual ported SRAM's with one write port and one read port so as to allow both read and write operations in every clock in this embodiment. Of course, internal registers 158*a* and 158*b* may be optionally addressed with a context register, so as to permit context switching between different processes that share the internal registers. As SRAM's (static random access memory) are being used for memory, the SRAM's can be single ported or dual ported. Therefore, for a single ported SRAM, there is a 1 clock penalty whenever an instruction that writes to the data memory is followed by an instruction that reads from the data memory. As is generally known, a single ported SRAM cannot perform both a write and a read operation in the same clock.

It should be appreciated that the configuration of the processor components illustrated in FIG. 6 allows for the specification of the width of the instructions, i.e., even if the processor and all the registers are 32 bits, the processor can operate on 8 bit and 16 bit wide operands. Here the various size instructions are designated by an extension, such as the extensions listed with reference to Note 1 of TABLE 2. For example, in the case of a byte operation, the operand may be bits [31:24], [23:16], [15:8] or [7:0] of the data word. Thus, align function 198*a*, 198*b*, and 198*c* will multiplex these four possibilities into bits [7:0] of the ALU's operand. In the case of a word operation, the operand may be bits [31:16] or [15:0]. Bits [31:16] are connected directly as the ALU operand. Thus, a byte level operation, a word level operation or a 32 bit operation become transparent to ALU 200 through the align function. In one embodiment, the align function shifts the operands so that the operand is always aligned with the lowest significant bit for processing by ALU 200. Where an 8 or 16 bit operand is being processed the higher bits are filled with 0's or 1's depending on the type of operation being performed. For example, with an addition operation it may be desired to fill the higher level bits with 0's. Thus, an 8 or 16 bit operand appears to the ALU as a 32 bit instruction. Of course, it is not necessary to shift a 32 bit operand. In summary, the align function shifts the operand and then extends the operand so that the operand appears as a 32 bit processor to ALU 200. Optional block 202 is in communication with ALU 200 and contains logic for executing special instructions, such as Galois field multiplication for ISCI cyclic redundancy check (CRC) computation or a hash instruction for implementing lookups.

Two flags used with the processor of FIG. 6 include a zero flag and a carry flag. The carry flag is latched to a flip flop, however, there is no storage information associated with the zero flag. That is, the zero flag information is automatically used with the information itself. Accordingly, there is no need to latch the zero flag since all the conditional instructions in the operation code (op-code) combine the operation that sets the flag with the checking of the flag. In one embodiment, the zero flag dependency from the adder path is eliminated, thereby enhancing the speed of the processing executing over the adder pathway. In this embodiment the zero flag is now dependent only on the logical operations pathway. It should be appreciated that the carry bit is latched so that the carry bit may be used by a subsequent operation, such as an add with a carry instruction.

The addresses for the different blocks in the processor's data memory (Data memory, I/P & O/P sockets, H/W accelerator, etc.) of FIG. 6 can be split into address spaces that can be independently decoded. The independent decoding is achieved by assigning to each individual decoder an address space that is a power of 2, and choosing a starting address that is an integer multiple of the addressable space. For example, if there are 17 bits of address space for a 9 bit address, where bits 0-8 are assigned for the address bits while bits 9-17 can be used for selection of the data. Thus, the address is divided into two parts such that, the higher bits will be used to derive a block select for each block, and the decoding for the locations within the block is done with the remaining lower address bits. Of course, it is not necessary to implement as much memory as is provided by the address depth since there will gaps in the address space according to what is actually implemented.

It should be appreciated that the Internal registers 158*a* and 158*b*, also referred to as accumulators, need to be duplicated because any of the processor (PRC) internal registers may be used as both the first and second operand, simultaneously. In one embodiment, both blocks will be implemented as a 32×32 register file with timing exactly similar to that of a synchronous SRAM. A bypass register is not needed for a register file, since there is no timing issue when the read and write address are the same on any clock.

As mentioned above, a large addressable memory is an important feature of the processor. However, in order to minimize the size of the memory while providing a large addressable memory, a single ported memory is provided. Accordingly, there is more memory space and less access logic as compared to a dual ported memory. In addition, the configuration of the two stage pipelining within the processor is balanced for the load being processed. More particularly, the instruction fetch and decode processing and the execute and write back processing are balanced. The load balancing has been achieved by partitioning of the logic so as to more uniformly re-distribute the delays along the critical paths of the two pipelined processes. An important part of this is the introduction of a synchronous SRAM for the data memory, I/P & O/P sockets. Use of a synchronous single ported SRAM will result in saving much of the address decode time and the routing time compared with a register-file implementation. The advantages gained with respect to power and density will also allow for the increase of the number of data locations to a large value. In turn, the increased data memory space also enables parsing all the received data without additional access delays.

A mask feature is provided also for the embodiments of the processor described herein. As mentioned above, any instruction can include a first operand, a second operand, where the second operand can be an immediate or an internal register operand. If the instruction specifies an internal register as the $2^{nd}$ operand, it may specify a mask to be used when operating on the $1^{st}$ operand. The immediate operand is part of the instruction itself, therefore, the immediate operand will take 32 bits of the instruction, i.e., for a 96 bit instruction width the immediate operand occupies 32 bits. If the immediate operand is not used in an instruction, then a mask may be used on the first operand. Where an internal register is used for the second operand rather than an immediate value, then the field for the immediate value is not used. The advantage of using a mask is that in the case of a packed data structure, the mask can be used to extract and use specific bits from the operand. It will be apparent to one skilled in the art that the mask enhances the capability of the instruction.

Source indirect register 194 and destination indirect register 196 are configured to enable a loadback feature within an instruction to automatically update the registers with a new offset value. The loadback feature defines the value by which register 194 and/or 196 should be incremented as specified explicitly in the instruction itself. This can be accomplished without increasing the instruction width, since in an indirect operation the address is unspecified and so may be used to specify the offset value. Thus, the use of the offset enables random accesses using indirect addressing on every instruction after setting up the initial address. One skilled in the art will appreciate that in this embodiment, a source indirect operation cannot immediately follow an instruction that initializes source indirect register 194, and likewise, a destination indirect operation cannot immediately follow an instruction that initializes destination indirect register 196.

It should be appreciated that the single cycle execution of the processor combined with the lack of an external agent interface and debug scheme found in other processors, eliminates the need for a state machine. Consequently, before a reset is removed, the program counter must be pointing to an already initialized section of microcode memory. Thus, a section of the microcode memory may be implemented as a ROM or it may be an SRAM that is initialized through the (Joint Test Action Group) JTAG chain. The program counter's reset value will also come from a register that is part of the JTAG chain.

Figure 8:
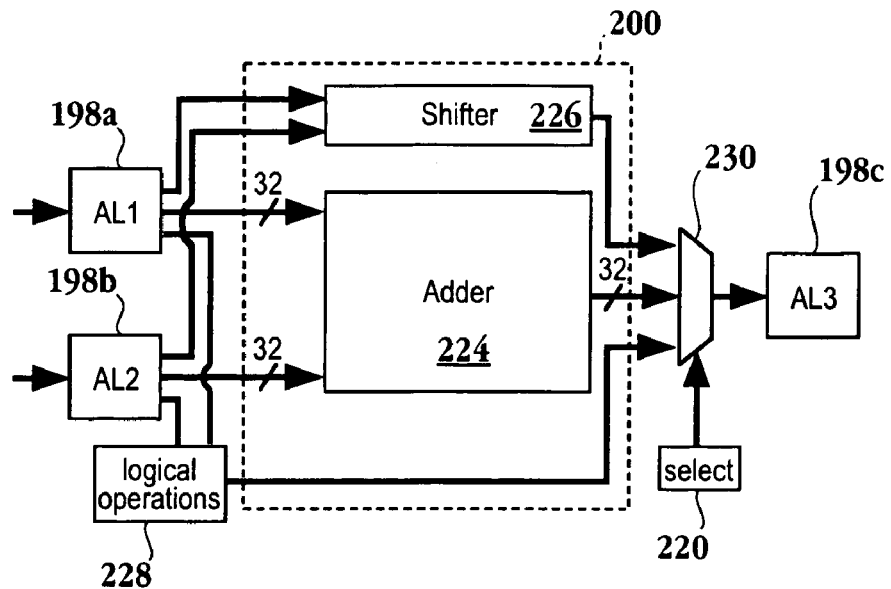
FIG. 8 is a simplified schematic of the parallel paths through adder and shifter components of an arithmetic logic in accordance with one embodiment of the invention.

FIG. 8 is a simplified schematic of the parallel paths through adder and shifter components of an arithmetic logic in accordance with one embodiment of the invention. Here, a 32 bit first operand and a 32 bit second operand are received by input alignment block 1 (AL1) 198a and input alignment block 2 (AL2) 198b, respectively. It should be appreciated that alignment blocks 1 and 2 enable 32 bit adder 224 to process an 8 bit, 16 bit, or 32 bit operand by the aligning the operand and extending the operand if the operand is less than 32 bits wide, as discussed with reference to FIG. 6. For example, if the operand is a byte level operand which occupies the highest 8 bits of a 32 bit instruction, input aligners AL1 198a and AL2 198b, realign the 8 bits and extend the 8 bits to a 32 bit instruction by adding 0's or 1's as described above. Parallel paths exist for the operands to be transmitted through shifter 226 and for logical operations 228. That is, the operands can either be transmitted through the pathway including adder 224 or shifter 226. Of course, logical operations such as "or" operations, "and" operations, etc. would be transmitted through another parallel pathway. It should be appreciated that the critical pathway, in terms of time consumption, are the pathways for shifter 226 and adder 224. With reference to FIG. 6, alignment blocks 198a, 198b, and 198c execute the alignment functionality referred to here. Returning to FIG. 8, 3 to 1 multiplexer 230 takes the output of shifter 226, adder 224, and logical operations 228 and transmits the appropriate signal, as determined by select signal 220, to output alignment block 3 (AL3) 198c. It should be appreciated that the data transmitted to AL3 198c may be configured with the lowest bit in the lowest position. In one embodiment, when performing the write back of the result of the processing through the ALU, it may be desired to realign the result back to the 32 bit logical position in memory. It should be appreciated that the align function enables a 32 bit adder to be used here rather than 4-8 bit adders where a carry flag is passed from each 8 bit adder.

Figure 9:
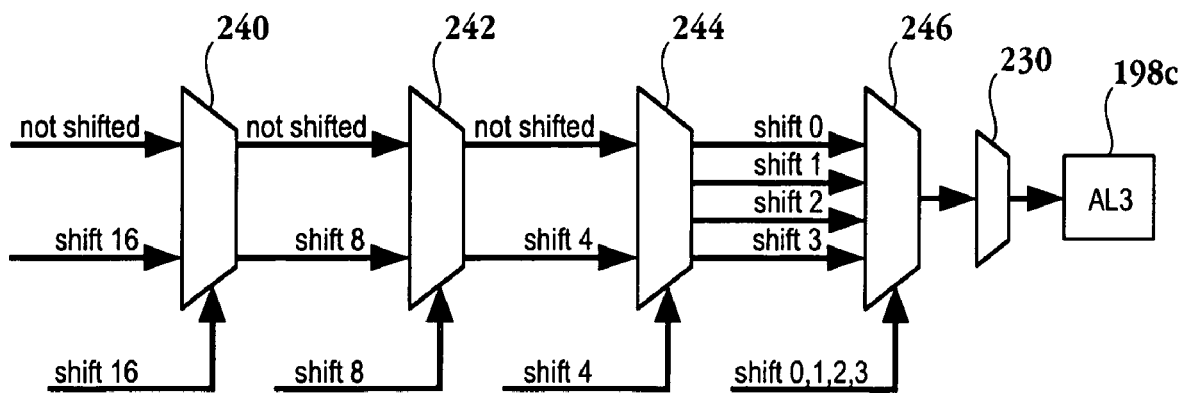
FIG. 9 is a more detailed schematic diagram of the configuration of the shifter of FIG. 8 in accordance of one embodiment of the invention.

FIG. 9 is a more detailed schematic diagram of the configuration of the shifter of FIG. 8 in accordance of one embodiment of the invention. As described with reference to FIG. 8, the shifter and adder paths are the most time consuming and have been configured to be independent of each other through the parallel configuration. The embodiment described with reference to FIG. 9 provides 4 multiplexers configured to shift incoming data in stages rather than using a 32:1 multiplexer. A 32:1 multiplexer would require much more space and the logic for the multiplexer would also be larger. The multiple stages of shifter 226 include multiplexer 240 where an incoming 32 bit operand is either shifted 16 bits or not shifted as determined by a select signal. That is, the select signal will specify to take a shift 16 value or a not shifted value. Next, the selected output of multiplexer 240 is input to multiplexer 242 and shifted 8 bits or the not shifted signal is selected as determined by a select signal. Then, the selected output of multiplexer 242 is input to multiplexer 244 and is shifted 4 bits or the not shifted signal is selected as determined by a select signal. The selected output of multiplexer 244 is input to multiplexer 246 and is shifted by 0, 1, 2, or 3 bits as determined by a select signal. The output from multiplexer 246 is then transmitted to multiplexer 230 and output alignment block AL3 198c as described with reference to FIG. 8.

Figure 10:
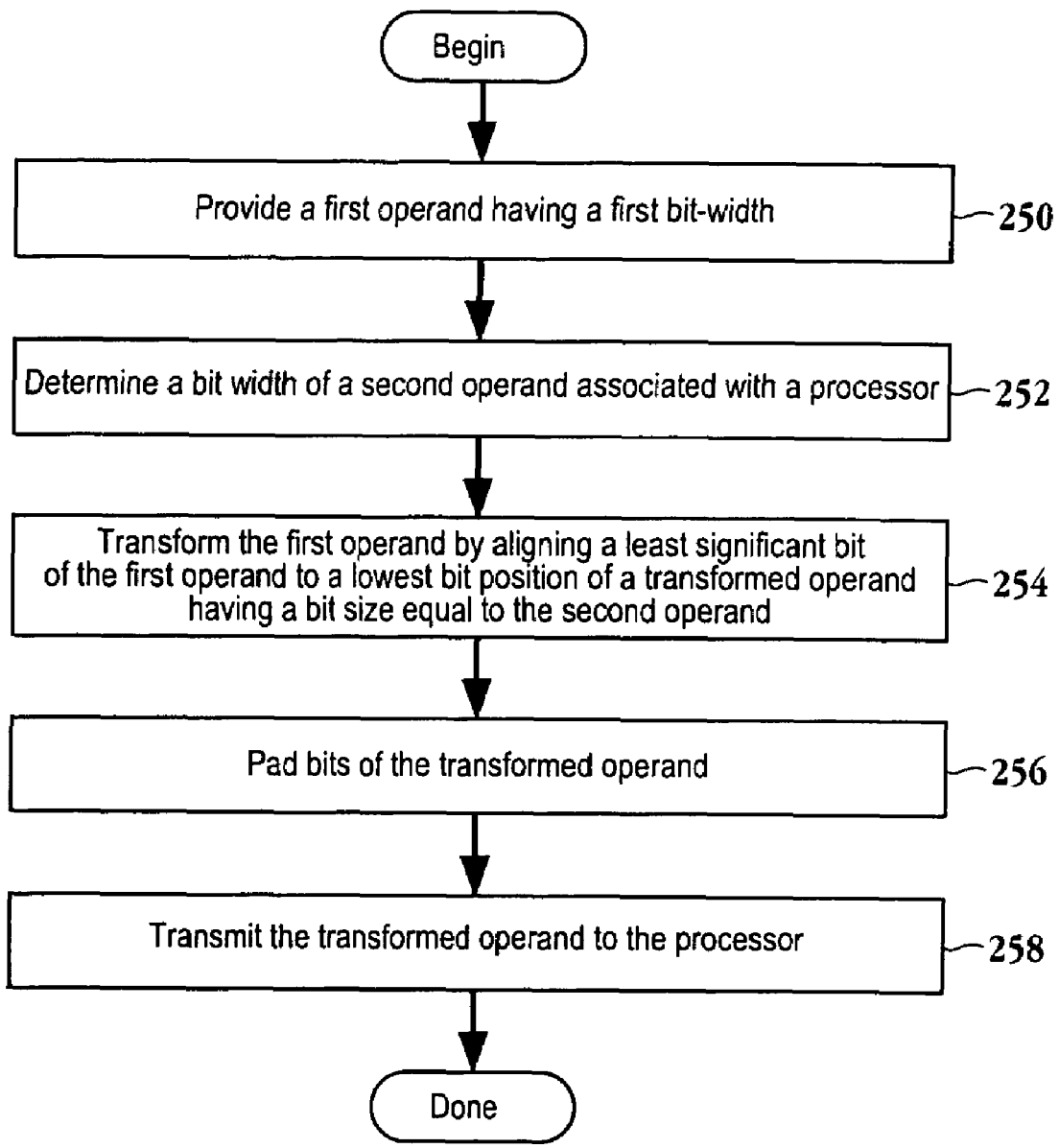
FIG. 10 is a flowchart diagram of the method operations for transparently presenting different size operands to be processed in accordance with one embodiment of the invention.

FIG. 10 is a flowchart diagram of the method operations for transparently presenting different size operands to be processed in accordance with one embodiment of the invention. The method initiates with operation 250 where a first operand having a first bit width is provided. As mentioned above, the operand can be a source operand, a destination operand, or an immediate or an internal register operand. It will be apparent to one skilled in the art that an operand can also be referred to as a computer instruction. In one embodiment, the operand is either an 8 bit operand, a 16 bit operand or a 32 bit operand. The method then advances to operation 252 where a bit-width of a processor operand is determined. In one embodiment, the processor may be configured to process 32 bit operands, i.e., a 32 bit processor. It should be appreciated that the processor may be an ALU as described with reference to FIGS. 6 and 8 and that the bit size of the processor operand is greater than or equal to the bit size of the first operand.

The method of FIG. 10 then moves to operation 254 where the first operand is transformed by aligning a least significant bit of the first operand to a lowest bit position of a transformed operand having a bit size equal to the processor operand. For example, where the first operand is an 8 bit operand and the processor is a 32 bit processor, the least significant bit of the first operand is aligned in the lowest bit position of a 32 bit operand. Then, in operation 256, the transformed operand, i.e., the 32 bit operand, is padded. As mentioned above, the padding can include inserting 1's or 0's depending on the type of operation. In essence, the first operand is sign extended to a bit size equal to the processor operand and the bits higher than the first operand bit size are filled with 1's or 0's. In one embodiment, the operation of sign extending takes the least significant bit of the first operand and repeats that bit until the bit size of the first operand is equal to the but size of the processor operand. The method then advances to operation 258 where the transformed operand is transmitted to the processor. It should be appreciated that the alignment process described above can be repeated on a processed operand prior to writing back the processed operand. For example, the 32 bit processed operand can be returned to an 8 bit operand for write back into a memory location.

An example of the sign extending and padding operations referred to above is now described. An eight bit operand and 16 bit operand may be processed through a 32 bit processor as described above. Here, the eight bit operand is sign extended to align with the 16 bit operand. That is, the least significant bit (LSB) from the eight bit operand is taken and repeated to extend the eight bit operand to a 16 bit operand. Thereafter, each of the 16 bit numbers are padded, one with a logical high value (1) and the other with a logical low value (0), to defined 32 bit numbers. Thus, a 32 bit adder is now capable of combining the two 32 bit numbers which were previously 8 and 16 bit numbers. One skilled in the art will appreciate that if there is a carry out from the operations described above, that carry out is propagated along the entire chain.

In summary, the embodiments of the present invention provide a processor configured for networking applications. The processor evaluates packet headers and decides what processing is to be performed. In one embodiment, the processor is a 32 bit processor that is enabled to process 8 bit, 16 bit and 24 bit wide operands through an align function that makes the various size operands appear as having a 32 bit width to the ALU. It should be appreciated that the ALU as configured allows for improved timing performance. The layout of the ALU is optimized and made compact through pre-placement. In one embodiment, other instructions or logic, specific to the kind of processing that may happen in a particular processor, such as Galois field multiplication for ISCI CRC computation or a hash for implementing lookups, could happen in a separate block that could be attached parallel to the ALU. The decode for the instruction could be distributed so as to allow selection of the final result from the ALU or from the customized block. Exemplary optional instructions include operation codes 0×20 and 0×21 with reference to TABLE 2.

The invention has been described herein in terms of several exemplary embodiments. Other embodiments of the invention will be apparent to those skilled in the art from consideration of the specification and practice of the invention. The embodiments and preferred features described above should be considered exemplary, with the invention being defined by the appended claims.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. It should be appreciated that the claims do not imply any particular order of steps or operations, unless explicitly stated that an ordering exists.

What is claimed is:

1. A method for efficiently shifting operands for processing, the method comprising:
   receiving an operand;
   selecting whether to apply one of a sixteen bit shift value or no shift value to the operand at a first stage;
   shifting the operand by the selected shift value;
   outputting the shifted operand to a second stage to select whether to apply one of an eight bit shift value or no shift value;
   outputting a result from the second stage to further stages in series, wherein a maximum shift value at each successive stage decreases relative to a previous stage processing the operand.

2. The method of claim 1, wherein the operands have a bit width of 32 bits.

3. The method of claim 1, wherein the method operation of processing the operand includes, aligning a least significant bit of the shifted operand to a least significant bit of another operand, the shifted operand having a bit width of one of 8 bits and 16 bits; and extending the bit width of the shifted operand to 32 bits.

4. The method of claim 3, wherein the method operation of extending the bit width of the shifted operand to 32 bits includes, padding the extended bit width with a digital value.

5. The method of claim 4, wherein the digital value is selected from the group consisting of 1 and 0.

6. The method of claim 4, wherein the method operation of padding the extended bit width with a digital value includes, determining the least significant bit of the shifted operand; and repeatedly inserting the least significant bit to the shifted operand until the shifted operand has been shifted by the shift value.

7. The method of claim 1, wherein the stages include a two to one multiplexer at the first stage, the second stage and a third stage and a four to one multiplexer at a fourth stage.

8. A method for transparently presenting different size operands to be processed, comprising:

providing a first operand having a first bit-width;

determining a bit width of a second operand associated with a processor, the second operand having a greater bit width than the first operand;

transforming the first operand by aligning a least significant bit of the first operand to a lowest bit position of a second operand, the transformed first operand having a bit size equal to the second operand;

padding bits of the transformed first operand;

selecting whether to apply one of a sixteen bit shift value or no shift value to the transformed first operand at a first stage;

shifting the transformed first operand by the selected shift value;

outputting the shifted operand to further stages, wherein a maximum shift value at each successive stage decreases relative to a previous stage; and processing the operand.

9. The method of claim 8, wherein the second operand is 32 bits wide.

10. The method of claim 8, wherein the first operand has a bit-width selected form the group of 8 bits and 16 bits.

11. The method of claim 8, wherein the method operation of padding bits of the transformed operand includes, filling higher bits of the transformed operand with a digital value, the higher bits of the transformed operand excluding values associated with the first operand.

12. The method of claim 8, wherein the method operation of padding bits of the transformed first operand includes, sign extending the first operand by a value associated with the least significant bit.

13. The method of claim 8, further including:

processing the transformed operand;

transforming the processed operand to a post-processed operand having a first bit-width; and writing back the post-processed operand to a memory location.

14. A processor, comprising:

an input socket configured to receive and transmit data packets;

a transform unit for manipulating data, the transform unit configured to receive data packets from the input socket;

an arithmetic logic unit (ALU) configured to process multiple operands, the ALU including, a shifter configured to shift each of the multiple operands in stages, wherein the shifter includes 3-two to one multiplexers and a four to one multiplexer, the 3-two to one multiplexers and the four to one multiplexer defining the four stages; and an adder configured to add operands;

an alignment block having circuitry configured to align a lowest significant bit of the each of the multiple operands prior to transferring the each of the multiple operands to the ALU, the alignment block circuitry extending the each of the multiple operands to a defined bit width so that a pre-extending bit width of the each of the multiple operands is transparent to the ALU; and a bus connecting the input socket, the transform unit, the ALU, and the alignment block.

15. The processor of claim 14, wherein the ALU is a 32 bit ALU.

16. The processor of claim 14, wherein the shifter and the adder are supplied with parallel pathways.

17. The processor of claim 14, further including:

a second alignment block downstream from the ALU, the second alignment block configured to return each of the multiple operands received from the ALU to an original bit width.

18. The processor of claim 14, wherein the adder is a 32 bit adder.

* * * * *